(12) United States Patent
Choe et al.

(10) Patent No.: US 12,259,817 B2
(45) Date of Patent: Mar. 25, 2025

(54) SMART STORAGE DEVICE USING A COMPUTER EXPRESS LINK (CXL) INTERFACE

(71) Applicant: SAMSUNG ELECTRONICS CO., LTD., Suwon-si (KR)

(72) Inventors: Hyeok Jun Choe, Hwaseong-si (KR); Youn Ho Jeon, Gimhae-si (KR); Young Geon Yoo, Seoul (KR); Hyo-Deok Shin, Seoul (KR); I Poom Jeong, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 257 days.

(21) Appl. No.: 17/403,862

(22) Filed: Aug. 16, 2021

(65) Prior Publication Data

US 2022/0100669 A1 Mar. 31, 2022

(30) Foreign Application Priority Data

Sep. 28, 2020 (KR) .......................... 10-2020-0126199
Jan. 20, 2021 (KR) .......................... 10-2021-0007897

(51) Int. Cl.
*G06F 12/0877* (2016.01)
*G06F 13/28* (2006.01)

(52) U.S. Cl.
CPC .......... *G06F 12/0877* (2013.01); *G06F 13/28* (2013.01); *G06F 2212/60* (2013.01); *G06F 2213/28* (2013.01)

(58) Field of Classification Search
CPC .................................................. G06F 12/0877

USPC ........................................................ 711/118
See application file for complete search history.

(56) References Cited

U.S. PATENT DOCUMENTS

| | | | |
|---|---|---|---|
| 4,935,866 A * | 6/1990 | Sauvajol | G06F 13/364 |
| | | | 709/201 |
| 10,503,641 B2 | 12/2019 | Boyer et al. | |
| 10,671,307 B2 | 6/2020 | Lee et al. | |
| 10,698,842 B1 * | 6/2020 | Dastidar | G06F 13/122 |
| 2017/0109286 A1 * | 4/2017 | Blankenship | G06F 8/77 |
| 2019/0042518 A1 * | 2/2019 | Marolia | G06F 13/4221 |
| 2020/0012604 A1 * | 1/2020 | Agarwal | G06F 12/0815 |
| 2020/0081660 A1 * | 3/2020 | Cohen | G06F 3/0659 |
| 2020/0133909 A1 * | 4/2020 | Hefty | G06F 13/28 |

(Continued)

FOREIGN PATENT DOCUMENTS

KR 10-1386013 4/2014

*Primary Examiner* — Titus Wong
(74) *Attorney, Agent, or Firm* — F. CHAU & ASSOCIATES, LLC

(57) ABSTRACT

A smart storage device is provided. The smart storage device includes a smart interface connected to a host device. An accelerator circuit is connected to the smart interface through a data bus conforming to a CXL.cache protocol and a CXL.mem protocol. The accelerator circuit is configured to perform acceleration computation in response to a computation command of the host device. A storage controller is connected to the smart interface through a data bus conforming to a CXL.io protocol. The storage controller is configured to control a data access operation for a storage device in response to a data access command of the host device. The accelerator circuit is directly accessible to the storage device through an internal bus connected directly to the storage controller.

19 Claims, 8 Drawing Sheets

(56) References Cited

U.S. PATENT DOCUMENTS

| | | | |
|---|---|---|---|
| 2020/0136996 A1* | 4/2020 | Li | G06F 12/1081 |
| 2020/0226018 A1* | 7/2020 | Das Sharma | G06F 11/10 |
| 2021/0014324 A1* | 1/2021 | Chilikin | G06F 12/0862 |
| 2021/0042228 A1* | 2/2021 | Herdrich | G06F 12/0895 |
| 2021/0073129 A1* | 3/2021 | Shah | G06F 12/126 |
| 2021/0373951 A1* | 12/2021 | Malladi | G06F 13/4282 |
| 2022/0197831 A1* | 6/2022 | Gorodetsky | H04L 47/629 |

\* cited by examiner

SMART STORAGE DEVICE USING A COMPUTER EXPRESS LINK (CXL) INTERFACE

CROSS-REFERENCE TO RELATED APPLICATION

This application claims priority under 35 U.S.C. 119 to Korean Patent Application No. 10-2020-0126199, filed on Sep. 28, 2020, and Korean Patent Application No. 10-2021-0007897, filed on Jan. 20, 2021, the contents of which are herein incorporated by reference in their entirety.

TECHNICAL FIELD

The present disclosure relates to a storage device, and more particularly, to a storage device using a Computer eXpress Link (CXL) interface.

DISCUSSION OF THE RELATED ART

Modern storage devices are capable of storing larger amounts of data and are equipped to operate at faster speeds.

However, host devices, such as central processing units (CPU) and graphics processing units (GPU), are most often connected to semiconductor devices, such as memory devices, through data buses operating pursuant to peripheral component interconnect express (PCIe) protocols. Data buses such as PCIe have a relatively low bandwidth and long delays, and problems related to coherency and memory sharing may commonly occur with semiconductor devices arranged in this manner.

SUMMARY

A smart storage device includes a smart interface connected to a host device, an accelerator circuit connected to the smart interface through a data bus conforming to compute express link (CXL).cache protocol and a CXL.mem protocol, and configured to perform acceleration computation in response to a computation command of the host device and a storage controller connected to the smart interface through a data bus conforming to CXL.io protocol and configured to control a data access operation for a storage device in response to a data access command of the host device. The accelerator circuit is directly accessible to the storage device through an internal bus connected directly to the storage controller.

A smart storage device includes a smart interface connected to a host device, a memory controller circuit connected to the smart interface through a data bus conforming to CXL.cache protocol and a CXL.mem protocol, and configured to control a first access operation for a memory device. A storage controller is connected to the smart interface through a data bus conforming to CXL.io protocol and configured to control a second access operation for a storage device. The smart interface includes an internal connection directly connecting the data bus conforming to the CXL.mem protocol and the CXL.io protocol to directly access the memory controller and the storage controller.

A smart storage device includes a smart interface connected to a host device. An accelerator circuit is connected to the smart interface through a data bus conforming to CXL.cache protocol and CXL.mem protocol, and configured to perform acceleration computation in response to a computation command of the host device. A storage controller is connected to the smart interface through a data bus conforming to a CXL.io protocol and configured to control a data access operation for a storage device in response to a data access command of the host device. An accelerator memory controller circuit is connected to the smart interface through the data bus conforming to the CXL.cache protocol and the CXL.mem protocol, and configured to control a second access operation for an accelerator memory device. The storage controller is directly accessible to the accelerator circuit and the accelerator memory controller circuit.

A method of operating a smart storage device includes receiving a command from a host device, transmitting the command to an accelerator circuit through a compute express link (CXL) interface, requesting, by the accelerator circuit, data access from a storage controller through an internal bus based on computation information extracted by decoding the command, accessing, by the storage controller, data from a storage device according to the request and receiving, by the accelerator circuit, a data access result received from the storage device to perform acceleration computation based on the command.

BRIEF DESCRIPTION OF THE DRAWINGS

The above and other aspects and features of the present disclosure will become more apparent by describing in detail various embodiments thereof with reference to the attached drawings, in which.

DETAILED DESCRIPTION OF THE EMBODIMENTS

Hereinafter, embodiments of the present disclosure will be described with reference to the accompanying drawings.

Figure 1:
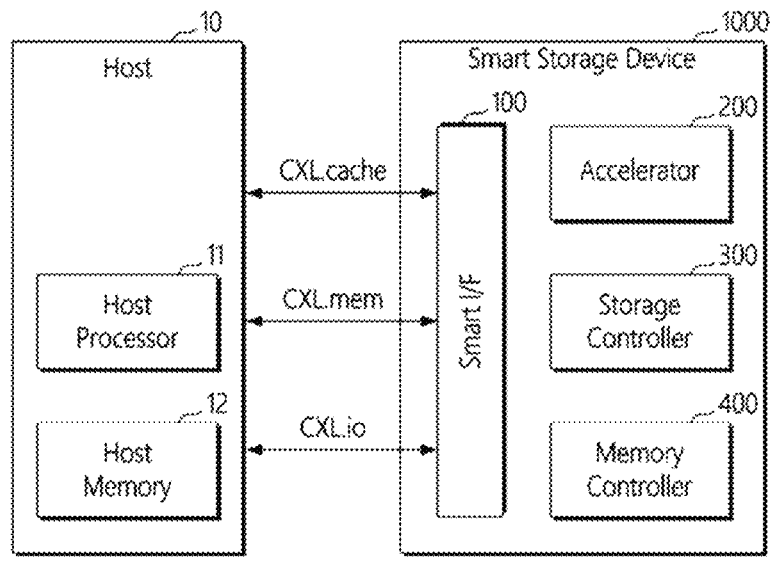
FIG. 1 is a block diagram illustrating a smart storage device in accordance with example embodiments of the present disclosure.

FIG. 1 is a block diagram illustrating a smart storage device according to embodiments of the present disclosure.

In some embodiments, a host device 10 may correspond to a central processing unit (CPU), a graphic processing unit (GPU), a neural processing unit (NPU), a field-programmable gate array (FPGA), a processor, a microprocessor, an application processor (AP), or the like. According to some embodiments, the host device 10 may be implemented as a system-on-a-chip (SoC). For example, the host device 10 may be a mobile system such as a portable communication terminal (mobile phone), a smart phone, a tablet computer, a wearable device, a healthcare device, an Internet of Things (IoT) device, a personal computer, a laptop/notebook computer, a server, a media player, or an automotive device such as a satellite navigation system. In addition, the host device 10 may include a communication device configured to transmit and receive signals between other devices outside the host device 10 according to various communication protocols. The communication device is a device that connects the host device 10 to a wired or wireless connection, and may include, for example, an antenna, a transceiver, and/or a modem. The host device 10 may be connected to, for example, an Ethernet network or may be connected to a wireless network through the communication device.

The host device 10 may include a host processor 11 and a host memory 12. The host processor 11 may control the overall operation of the host device 10, and the host memory 12 is a working memory and may store instructions, programs, data, or the like, that may be necessary for the operation of the host processor 11.

A smart storage device 1000 may be a data center or an artificial intelligence learning data device according to embodiments of the present disclosure. The smart storage device 1000 may be a semiconductor device capable of performing computations and storing data, such as processing-in-memory (PIM) or computing-in-memory (CIM).

The smart storage device 1000 may include a smart interface 100, an accelerator circuit 200, a storage controller 300, and a memory controller 400. The smart storage device 1000 may include the smart interface 100, the accelerator 200, and the storage controller 300 according to some embodiments, or may include the smart interface 100, the storage controller 300, and the memory controller according to some embodiments or may include the smart interface 100, the accelerator 200, the storage controller 300, and the memory controller according to some embodiments.

The smart storage device 1000 illustrated in FIG. 1 is a semiconductor device using a Computer eXpress Link (CXL) interface according to some embodiments. The smart interface 100 uses the CXL interface according to some embodiments.

The CXL interface is a computer device interconnector standard, and is an interface that may reduce the overhead and waiting time of the host device and the smart storage device 1000 and may allow the storage space of the host memory and the memory device to be shared in a heterogeneous computing environment in which the host device 10 and the smart storage device 1000 operate together. For example, the host device 10 and the system-on-chip, GPU, which performs complex computations, and an acceleration module, such as a field-programmable gate array (FPGA), directly communicate and share memory. The smart storage device 1000 of the present specification is based on the CXL standard.

The host device 10 may be connected to at least one of the accelerator circuit 200, the storage controller 300, or the memory controller 400 through the smart interface 100 to control the overall operation of the smart storage device 1000.

The smart interface 100 is configured to utilize CXL sub-protocols such as CXL.io, CXL.cache, and CXL.mem. The CXL.io protocol is a PCIe transaction layer, which is used in the system for device discovery, interrupt management, providing access by registers, initialization processing, signal error processing, or the like. The CXL.cache protocol may be used when the accelerator circuit 200 accesses the host memory 12 of the host device. The CXL.mem protocol may be used when the host device 10 accesses an accelerator memory 290 of the accelerator circuit 200 (see FIG. 2) or the memory device 490 connected to the memory controller 400 (see FIG. 7).

The accelerator circuit 200 may perform an acceleration computation according to a computation command of the host device 10. According to some embodiments, the accelerator circuit 200 may be a neural network processing unit, an AI accelerator, a CPU, a graphical processing unit (GPU), a digital signal processing unit (DSP), a neural processing unit (NPU), a coprocessor, or another suitable processor.

The storage controller 300 may be connected to at least one storage device 390 to control an operation of the storage device 390. For example, an access operation such as reading or deleting data stored in the storage device 390 or writing data may be included. The at least one storage device 390 may include a non-volatile memory device (for example, NAND memory device) or some other suitable form of memory.

The memory controller 400 may be connected to at least one memory device 490 (see FIG. 7) to control an operation of the memory device 490. For example, an access operation such as reading or deleting data stored in the memory device 490 or writing data may be included.

According to some embodiments, at least one storage device 390 connected to the storage controller 300 and at least one memory device 490 connected to the memory controller 400 may be included in the smart storage device 1000, may be embedded, or may be implemented to be detachable. A detailed description is provided below.

The memory controller 400 may maintain data coherence between the memory device 490 and the host memory 12 of the host device 10 with a very high bandwidth through the host device 10 and the CXL interface. For example, the host device 10 may use the memory included in the smart storage device 1000 as a working memory of a host device 10 that supports cache coherence, and may access data through the memory or a load/store memory command. Data coherence may be performed by, for example, coherence processing according to the MESI protocol. The MESI protocol may define an inter-memory state between the memory device and the host device by including an invalid state, a shared state, a modified state, and an exclusive state, and may perform the coherence operation according to the defined state.

When performing data access among the accelerator circuit 200, the storage controller 300, and the memory controller 400, the smart storage device 1000 may perform direct access through an internal connection between the accelerator circuit 200 and the storage controller 300, or between the storage controller 300 and the memory controller 400, without the intervention of the host device 10.

Figure 2:
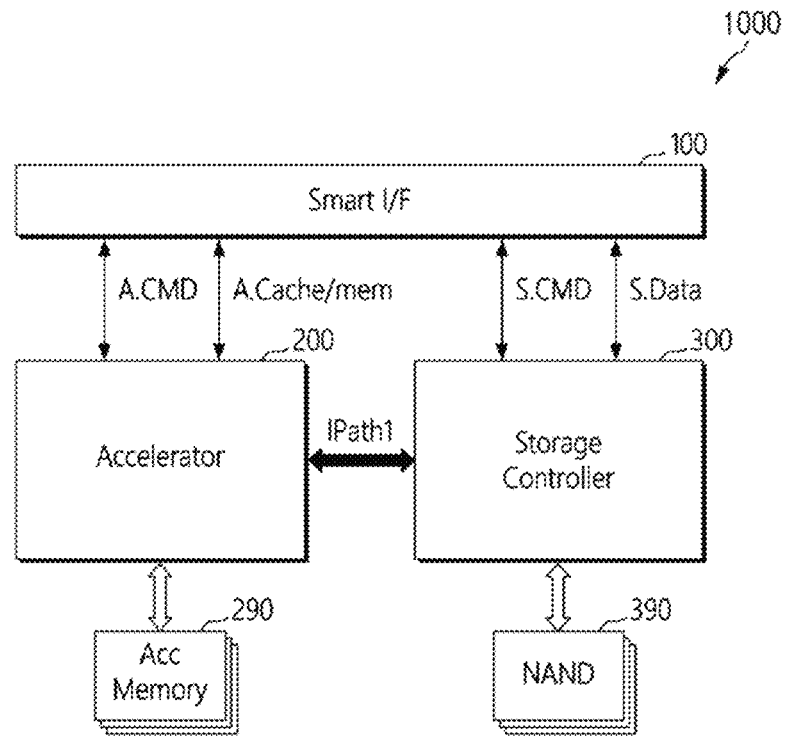
FIG. 2 is a block diagram illustrating the smart storage device of FIG. 1.
Figure 3:
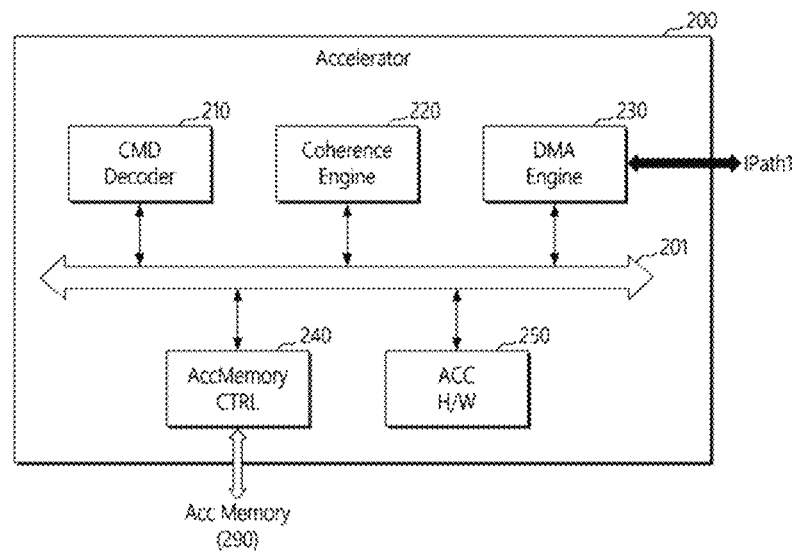
FIG. 3 is a block diagram illustrating the accelerator circuit of FIG. 2.

FIG. 2 is a block diagram showing the smart storage device of FIG. 1 according to some embodiments. FIG. 3 is a block diagram illustrating the accelerator circuit of FIG. 2 according to some embodiments, and FIG. 4 is a block diagram illustrating the storage controller of FIG. 2 according to some embodiments.

Figure 4:
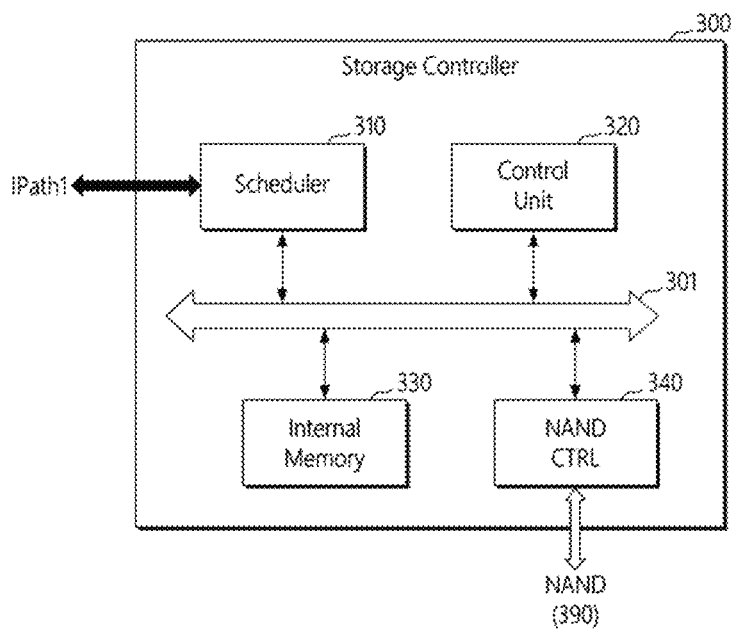
FIG. 4 is a block diagram illustrating the storage controller of FIG. 2.

Referring to FIGS. 2 to 4, according to some embodiments, the accelerator circuit 200 may be connected to the host device 10 through the CXL.cache protocol and the CXL.mem protocol of the smart interface 100. The accelerator circuit 200 may transmit and receive a command (A.CMD) and computation data (A.cache/mem) to and from the host device 10, and depending on the subject sending the data, may transmit and receive data by selecting one of the CXL.cache protocol or the CXL.mem protocol.

As described herein, reference to the various CXL sub-protocols might be used to refer to a data bus conforming to the respective CXL sub-protocol. Thus, when it is said that the accelerator circuit 200 is connected to the host device 10 through the CXL.cache protocol and the CXL.mem protocol, it may be understood that the accelerator circuit 200 is connected to the host device 10 though a data but that operates pursuant to the CXL.cache and CXL.mem subprotocols of the CXL protocol.

The accelerator circuit 200 may include at least one accelerator memory 290. The accelerator memory 290 of the accelerator circuit 200 may be dedicated to the accelerator circuit 200, which may be understood to mean that the memory 290 is only accessible by the accelerator circuit 200 and is not accessible by any other device independent of the accelerator circuit 200. Thus, accelerator memory is not shared memory. The accelerator memory 290 may be a non-volatile memory or a volatile memory according to various embodiments. The accelerator memory 290 as a working memory may be a volatile memory such as dynamic RAM (DRAM), static RAM (SRAM), or synchronous dynamic RAM (SDRAM) according to some embodiments, or may be at least one of non-volatile memories according to some embodiments.

The accelerator memory 290 may be implemented by being embedded in the accelerator circuit 200 according to various embodiments, may be electrically connected by being disposed outside the accelerator circuit 200, or may be implemented as a detachable/removable memory to the accelerator circuit 200.

According to some embodiments, the storage controller 300 may be connected to the host device 10 through the CXL.io protocol of the smart interface 100. The host device 10 and the storage controller 300 may transmit and receive a data access request (S.CMD) and data (S.Data) through the CXL.io protocol of the smart interface 100.

The storage controller 300 may include at least one storage device 390. The storage device 390 may be a non-volatile memory device, and the non-volatile memory may include, for example, a flash memory (e.g., NAND flash or NOR flash, or the like), a hard drive, or a solid state drive (SSD) or other storage technology.

The storage device 390 may perform delete, write, or read operation, or the like of data under the control of the storage controller 300. To this end, the storage device 390 receives a command CMD and an address ADDR from the storage controller 300 through an input/output line, and transmits and receives data DATA for a program operation or a read operation to and from the storage controller 300. In addition, the storage device 390 may receive a control signal CTRL through the control line, and the storage device 390 may receive power PWR from the storage controller 300.

According to some embodiments, the accelerator circuit 200 and the storage controller 300 may be connected to each other through an internal bus Ipath1. The accelerator circuit 200 may directly access the storage controller 300 through the internal bus Ipath1. For example, the accelerator circuit 200 may directly request access to data of the storage device 390 without intervention of the host device 10.

As is shown in FIG. 3, the accelerator circuit 200 may include a command decoder circuit 210, a coherency engine 220 (which may also be referred to as a coherence engine), a direct memory access (DMA) engine 230, a accelerator memory controller 240, and a computation module 250 according to some embodiments, and the respective components may be electrically connected to each other through an accelerator system bus 201. As used herein, the phrase "engine" may refer to a logic circuit executing commands to perform a particular function.

When receiving a command, for example, a computation command from the host device 10, the command decoder circuit 210 decodes the received computation command to extract computation information. The computation information may include, for example, a computation type, an address of data to be computed, or the like.

The coherency engine 220 maintains coherency between the data stored in the accelerator memory 290 of the accelerator circuit 200 and the data in the memory 12 of the host device 10. For example, coherence processing is performed so that the host device 10 uses the data stored in the accelerator memory 290 of the accelerator circuit 200 as a host-attached memory. For example, when new computation data is stored in the accelerator memory 290, the coherency engine 220 may perform coherence processing through the CXL.cache protocol to store the computation data also in the memory 12 of the host device in the same manner. Similarly, the host device 10 may perform coherence processing for sharing data in the memory 12 of the host device to the accelerator memory 290 through the CXL.mem protocol.

The DMA engine 230 may be connected to the internal bus Ipath1 and may directly access the storage controller 300. When it is necessary to write or read data to or from the storage device 390 according to the request of the computation module 250 or the host device 10, the DMA engine 230 may request data access to the storage controller 300.

The accelerator memory controller 240 may control an operation of the accelerator memory 290. For example, control may be performed so that computation data stored in the accelerator memory 290 is read or deleted, or new computation data is written.

The computation module 250 may perform acceleration computation according to the decoded computation command. Acceleration computation may include signal processing and image signal processing according to some embodiments as well as computation processing based on various types of networks such as neural processing, for example, convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzman machine (RBM), fully convolutional network, long short-term memory (LSTM) network, classification network, or the like.

As is shown in FIG. 4, the storage controller 300 may include a scheduler 310, a control unit 320, an internal memory 330, and a non-volatile memory controller 340 according to some embodiments, and the respective components may be electrically connected to each other through an internal system bus 301.

The scheduler 310 may be connected to each of the internal bus Ipath1 and the smart interface 100, and may schedule the operation sequence according to a preset policy when receiving an access request from the host device 10 and an access request from the accelerator circuit 200. The preset policy may be to give priority to an access request from the accelerator circuit 200 over an access request from the host device 10 according to some embodiments. Alternatively, priority may be given to process the urgent request of the host device 10 before other requests that have already been ordered.

The control unit 320 may control the overall operation of the storage controller 300, and may perform, for example, data access operations such as writing, reading, or deleting data in the storage device 390 and the internal operation of the storage device 390, or the like.

The internal memory 330 may be a working memory of the storage controller 300 and may store operation data generated while the storage controller 300 is driven.

The non-volatile memory controller 340 may control at least one non-volatile memory device 390 connected to the storage controller 300.

Figure 5:
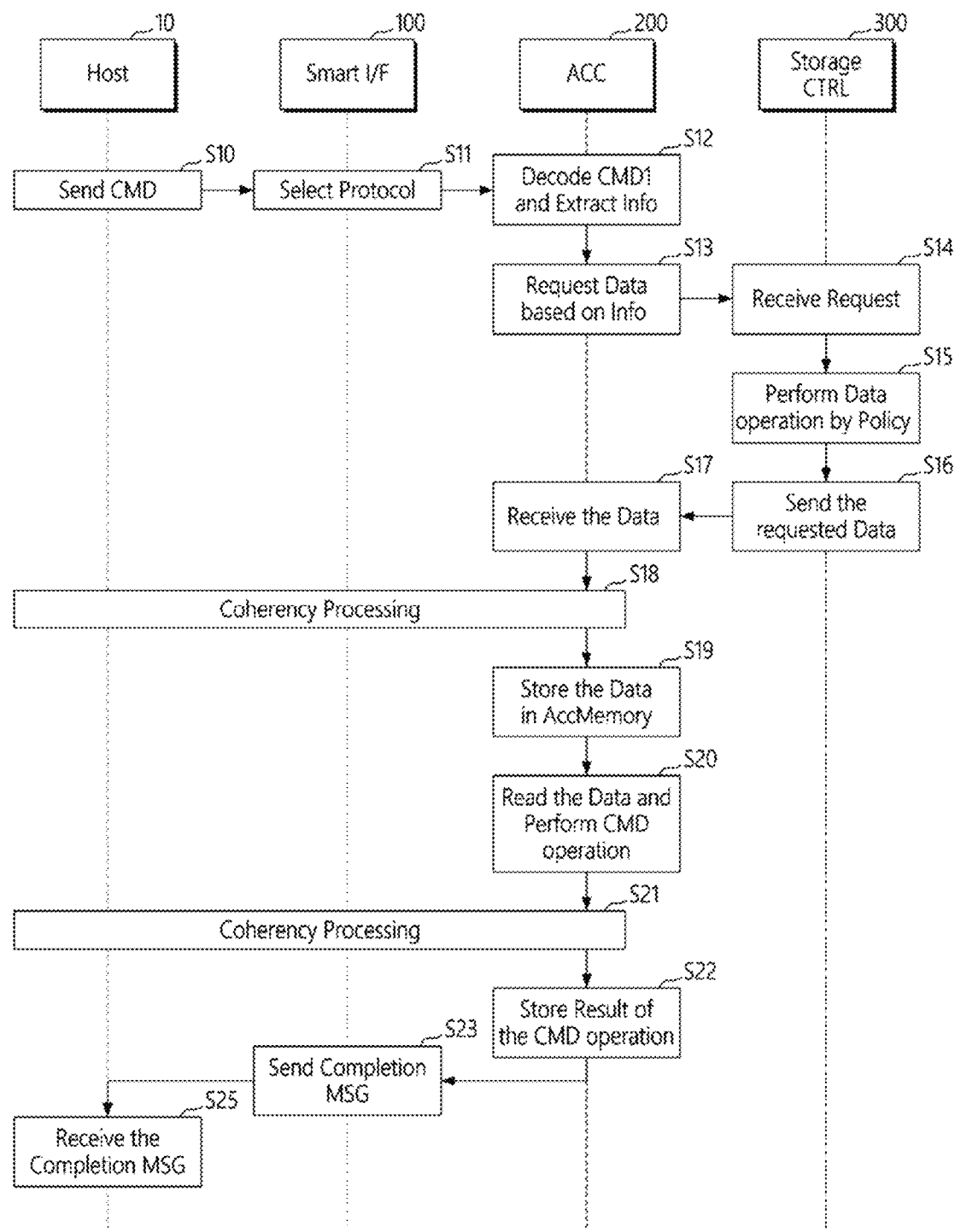
FIGS. 5 and 6 are flowcharts illustrating a method of operating the smart storage device of FIG. 2.
Figure 6:
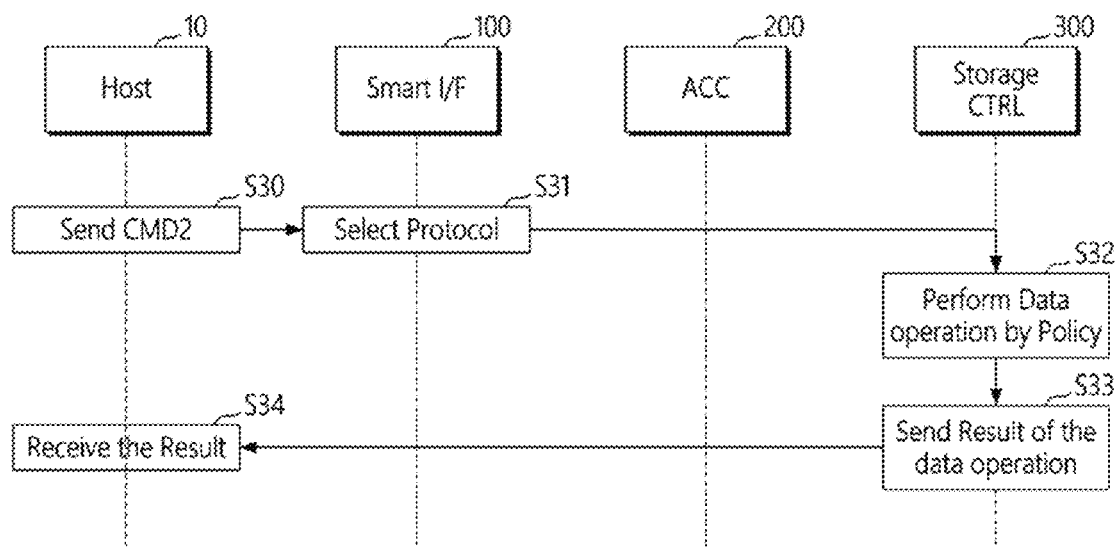

FIGS. 5 and 6 are flowcharts illustrating an operating method of the smart storage device of FIG. 2.

Referring to FIG. 5, first, the host device 10 transmits a command to the smart storage device 1000 (step S10). The smart interface 100 of the smart storage device 1000 checks which constituent the command is for and selects and transmits a protocol of the corresponding component (step S11). For example, when the host device 10 sends a computation command, the smart interface 100 connects through a protocol (CXL.cache or CXL.mem) for the accelerator circuit 200.

The accelerator circuit 200 extracts computation information by decoding a received computation command CMD1 (step S12). The computation information may include, for example, a computation type, an address of data necessary for the computation, or the like. According to some embodiments, the computation command may include at least one operation to be performed by the accelerator circuit 200. In the embodiment described below, it is assumed that the computation command CMD1 indicates a case where acceleration computation is performed based on data of the storage device 390.

The accelerator circuit 200 transmits a data access request to the storage controller 300 (step S13). In this case, the access request may be directly requested to the storage controller 300 through the internal bus Ipath1 without intervention of the host device 10.

When receiving the access request from the accelerator circuit 200 (step S14), the storage controller 300 performs an operation according to the access request on the storage device 390 in an operation order determined according to a preset policy (step S15). For example, the storage controller 300 schedules a plurality of access requests according to a preset policy through a scheduler to determine an operation order. The control unit 320 and the non-volatile memory controller 340 perform an access operation on the non-volatile memory device 390 according to an order determined by the scheduler 310.

The storage controller 300 transmits the performance result of the access to the accelerator circuit 200 (step S16). For example, in the case of a data read request, the read data (hereinafter, first data) is returned, and in the case of a data write or deletion request, the performance completion is returned.

When receiving a performance result, for example, the read first data (step S17), the accelerator circuit 200 performs coherence processing with the host device 10 to store the data in the accelerator memory 290 (step S18). At this time, coherence processing may be performed through the CXL.cache protocol. The coherence processing may be performed by the coherence-related component on the side of the host device 10 and the coherency engine 220, and after the coherency engine 220 confirms completion of the coherence processing from the host device 10, the first data may be stored in the accelerator memory 290 through the accelerator memory controller 240 (step S19).

The accelerator circuit 200 reads the first data stored in the accelerator memory 290 as a subsequent operation and performs a computation (step S20). In this case, the computation may be based on the type of computation included in the computation information. The accelerator circuit 200 performs coherence processing with the host device 10 to store the second data generated by performing the computation in the accelerator memory 290 (step S21). At this time, coherence processing may be performed through the CXL-.cache protocol. When the coherency engine 220 confirms completion of the coherence processing from the host device 10, the accelerator memory controller 240 stores the second data in the accelerator memory 290 (step S22).

When all of one or more operations according to the computation command CMD1 are completed, the accelerator circuit 200 transmits a completion message to the host device 10 through the smart interface 100 (step S23). In this case, the completion message may include the second data or a value set based on the second data. The completion message is thereafter received by the host device 10 (step S25).

The above-described embodiment assumes a case where an acceleration computation is performed using data stored in the storage device 390, but the embodiment of the present disclosure is not limited thereto, and the acceleration computation may be performed based on the accelerator memory 290 or the initial data of the memory 12 of the host device. In this case, sharing the acceleration computation result with the host device 10 may be performed as in the steps S19 to S25, but the steps S13 to S17 might not be performed depending on the position of the initial data to be read.

Meanwhile, referring to FIG. 6, when the host device 10 transmits a command CMD2 (step S30), the smart storage device 1000 checks which constituent is targeted at the smart interface 100, and selects and transmits the protocol of the corresponding component (step S31). For example, when the host device 10 requests data access, the smart interface 100 connects to the storage controller 300 through the CXL.io protocol.

When the storage controller 300 receives the command CMD2 from the host device 10, the scheduler 310 determines an operation sequence according to a preset policy. The control unit 320 and the non-volatile memory controller 340 perform a data access operation according to an order determined by the scheduler 310 (step S32).

The storage controller 300 transmits the performance result of the step S32 to the host device 10 (step S33). For example, when the command CMD2 is a data read request, the read data is transmitted to the host device 10, and when it is a data write or deletion request, the performance completion is transmitted to the host device 10. The host device 10 receives the performance result through the storage controller 300 and the CXL.io protocol (step S34).

Figure 7:
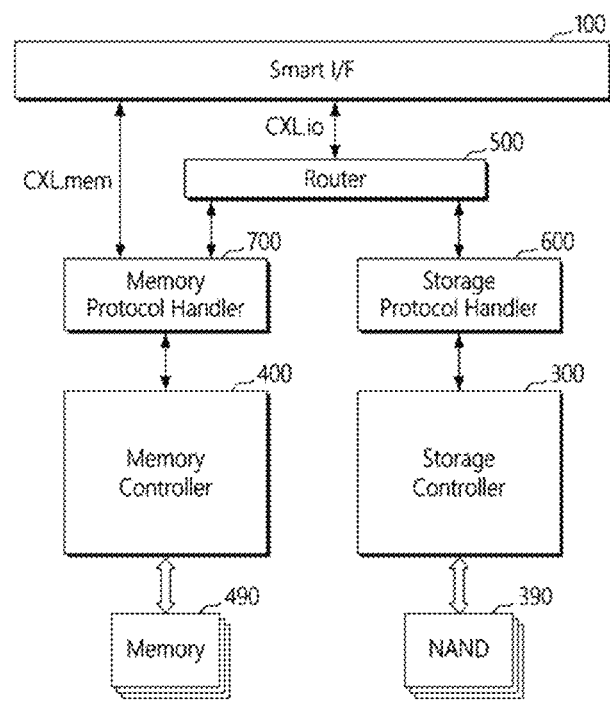
FIG. 7 is a block diagram illustrating the smart storage device of FIG. 1.
Figure 8:
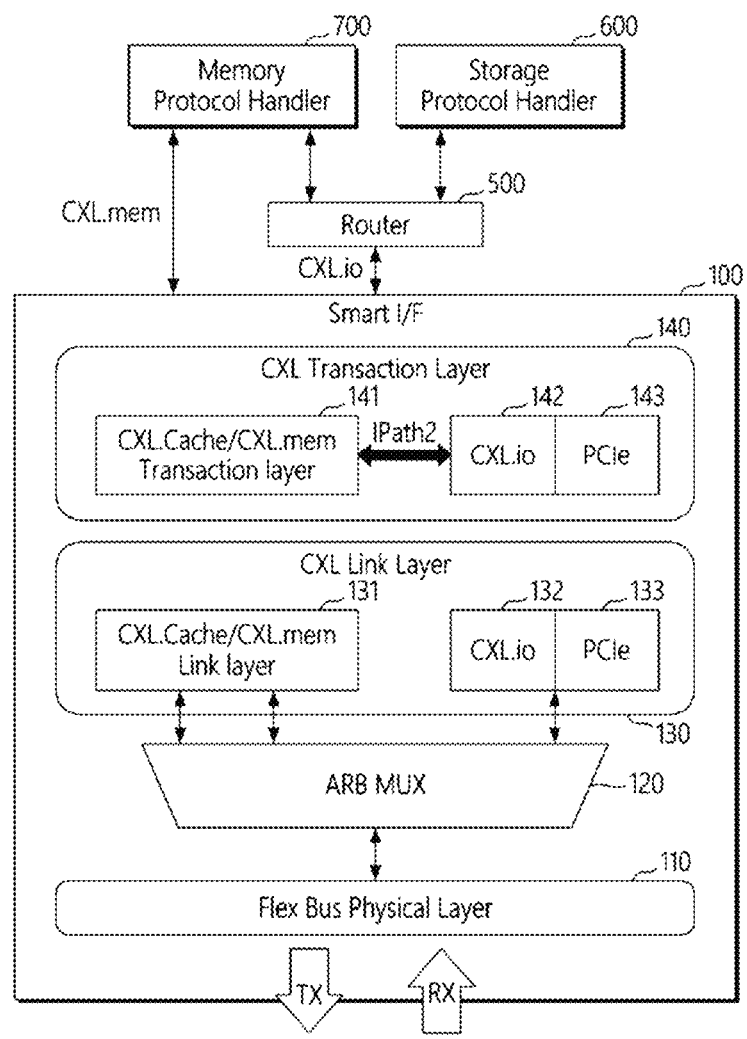
FIG. 8 is a block diagram illustrating the smart interface of FIG. 1.

FIG. 7 is a block diagram showing the smart storage device of FIG. 1 according to some embodiments. FIG. 8 is a block diagram showing the smart interface of FIG. 1 according to some embodiments.

Referring to FIGS. 7 and 8, the smart storage device 1000 may transform a signal received from the host device 10 into a signal of the CXL.mem protocol, the CXL.io protocol, or the CXL.cache protocol in the smart interface 100, and may transmit the signal to each of the components 200, 300, and 400.

The smart interface 100 may include a plurality of layers to communicate with the host device 10. Each layer may interpret the electrical signal transmitted and received based on a preset definition, and may transform the signal into a signal for operating each of the components (e.g., 200, 300, and 400) in the smart storage device 1000.

The smart interface 100 may include a physical layer 110, an arbiter 120, a link layer 130, and a transaction layer 140, and each configuration will be said to operate based on the CXL interface standard. In addition, the smart interface 100 may further include various other communication layers.

The physical layer 110 interprets an electrical signal transmitted to the host device 10 (TX) or received from the host device 10 (RX). The arbiter 120 may multiplex to decide which sub-protocol is used to send the signal outputted from the physical layer 110. For example, for the accelerator circuit 200, it is outputted to a CXL.cache or CXL.mem link layer 131, and for the memory device 490, the storage device 390, or a heterogeneous device using a PCI interface, it is outputted to a CXL.io link layer 132 or a PCIe link layer 133.

The transaction layer 140 receives a signal transmitted through the CXL.cache or CXL.mem link layer 131, the CXL.io link layer 132, or the PCIe link layer 133 through transaction layers 141, 142, and 143 corresponding to each protocol, and generates an output.

The smart interface 100 includes an internal connection Ipath2 directly connecting the CXL.mem protocol and the CXL.io protocol, and the internal connection Ipath2 directly connects data access between the memory controller 400 and the storage controller 300. According to some embodiments, the CXL.cache or CXL.mem link layer 131 and the CXL.io link layer 132 may be directly connected to each other through an internal connection bus IPath2.

According to some embodiments, the storage controller 300 may be connected to the host device 10 through the CXL.io protocol of the smart interface 100.

For example, the memory controller 400 may be connected through the CXL.mem protocol or the CXL.io protocol, and the storage controller 300 may be connected through the CXL.io protocol.

According to some embodiments, the smart storage device 1000 may further include a router 500, a memory protocol handler 700, and a storage protocol handler 600 for more efficient data access among the components 200, 300, and 400.

The router 500 may be connected to the CXL.io transaction layer 142 and may route a signal received from the transaction layer to the memory controller 400 or the storage controller 300. The router 500 may be disposed within the smart interface 100 according to some embodiments, and may be separately disposed and implemented with respect to each of the smart interface 100, the storage controller 300, and the memory controller 400 according to some embodiments.

The memory protocol handler 700 may be connected between the CXL.mem transaction layer 141 and the router 500, and the memory controller 400, may receive and transfer a data access request for the memory device 490 to the memory controller 400, and may return a request result from the memory controller 400 to the transaction layer 141 or the router 500. The memory protocol handler 700 may be disposed within the smart interface 100 according to some embodiments, may be separately disposed and implemented with respect to the memory controller 400 according to some embodiments, respectively, and may be disposed within the memory controller 400 according to some embodiments.

The storage protocol handler 600 may be connected between the router 500 and the storage controller 300, may receive and transfer a data access request for the storage device 390 to the storage controller 300, and may return the request result to the transaction layer 142. The storage protocol handler 600 may be disposed within the smart interface 100 according to some embodiments, may be separately disposed and implemented with respect to the storage controller 300 according to some embodiments, respectively, and may be disposed within the storage controller 300 according to some embodiments.

When receiving a data access command from the router 500, the storage protocol handler 600 parses the access command to check the address of the requested data. In this case, the access command may include an operation type, an address of data, or data.

When the address of the data parsed by the access command is the storage device 390, the storage protocol handler 600 transfers the access command to the storage controller 300.

When the address of the data parsed by the access command is the memory device 490, the storage protocol handler 600 transfers the access command to the memory protocol handler 700 through the internal connection Ipath2. The memory controller 400 may perform a data access operation for the memory device 490 based on an access command transferred through the memory protocol handler 700 and notify the storage protocol handler 600 of the performance result. When the performance operation corresponding to the parsed access command is completed, the storage protocol handler 600 may notify the host device 10 of the performance completion through the smart interface 100.

The descriptions of the storage controller 300 and the non-volatile memory device 390 overlap those of FIG. 2, and thus to the extent that descriptions of various elements is omitted, it may be assumed that those elements are at least similar to corresponding elements that are described elsewhere within the instant disclosure.

The memory controller 400 may control an operation of the memory device 490. For example, control may be performed so that computation data stored in the memory device 490 may be read or deleted, or new computation data may be written.

The memory device 490 may be a volatile memory such as dynamic RAM (DRAM), static RAM (SRAM), or synchronous dynamic RAM (SDRAM) according to some embodiments, or may be at least one of non-volatile memories according to some embodiments. A nonvolatile memory may be implemented as at least one of, for example, one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, or the like), a hard drive, or a solid state drive (SSD). Alternatively, it may be implemented in a form such as a memory card (e.g., compact flash (CF), secure digital (SD), micro secure digital (Micro-SD)), mini secure digital (Mini-SD), extreme digital (xD), multi-media card (MMC), or the like) or an external memory (e.g., USB memory) that may be connected to a USB port.

The memory device 490 may be, for example, a working memory of the smart storage device 1000. The memory device 490 may be implemented in the form of an embedded memory according to the purpose of storing data, or may be implemented in the form of a removable memory. For example, data for driving the smart storage device 1000 may be stored in a memory embedded in the smart storage device 1000, and data for an extended function of the smart storage device 1000 may be stored in a memory that is removable in the smart storage device 1000.

Figure 9:
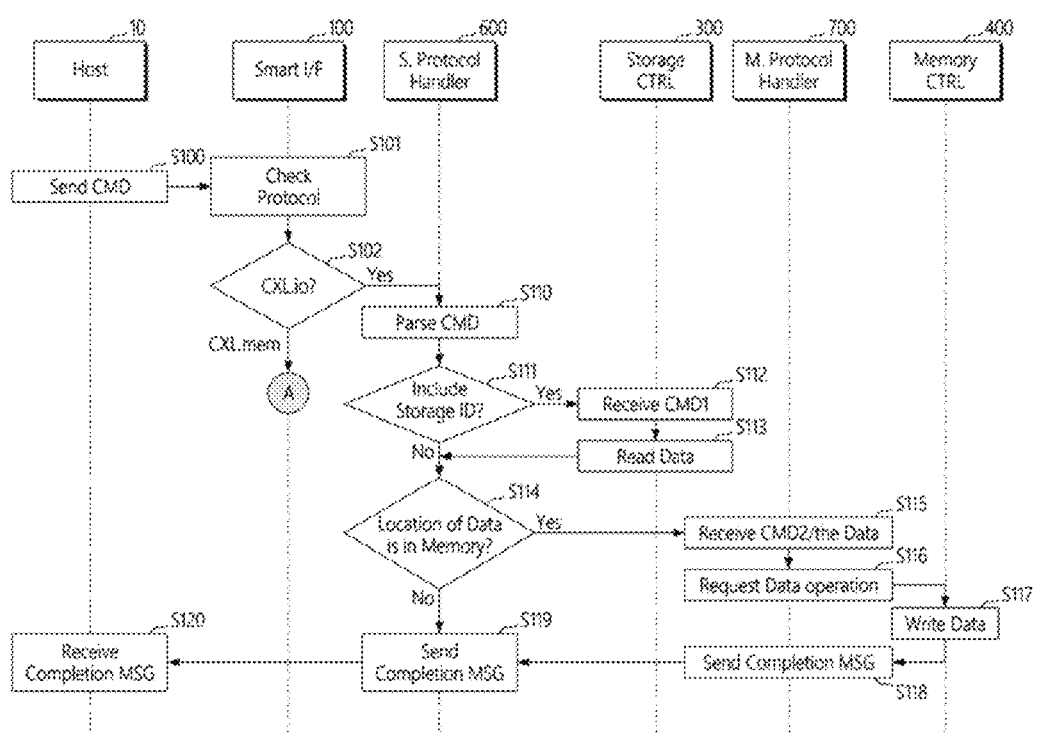
FIGS. 9 to 11 are flowcharts illustrating a method of operating the smart storage device of FIG. 7.
Figure 10:
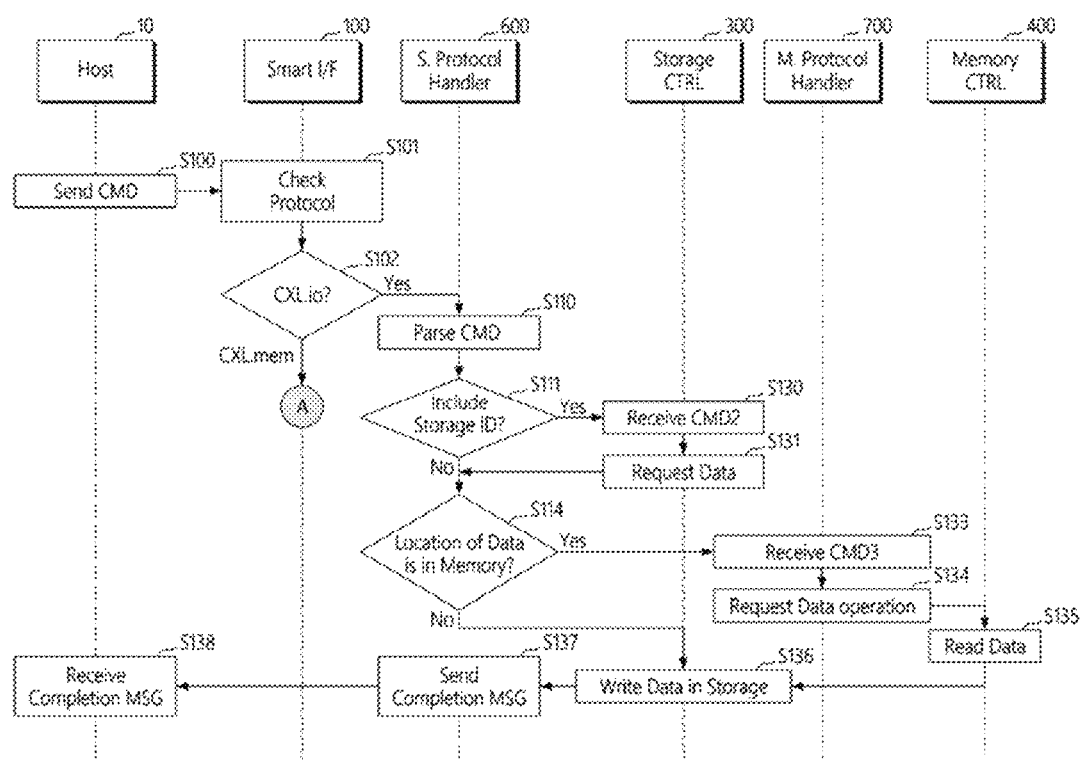
Figure 11:
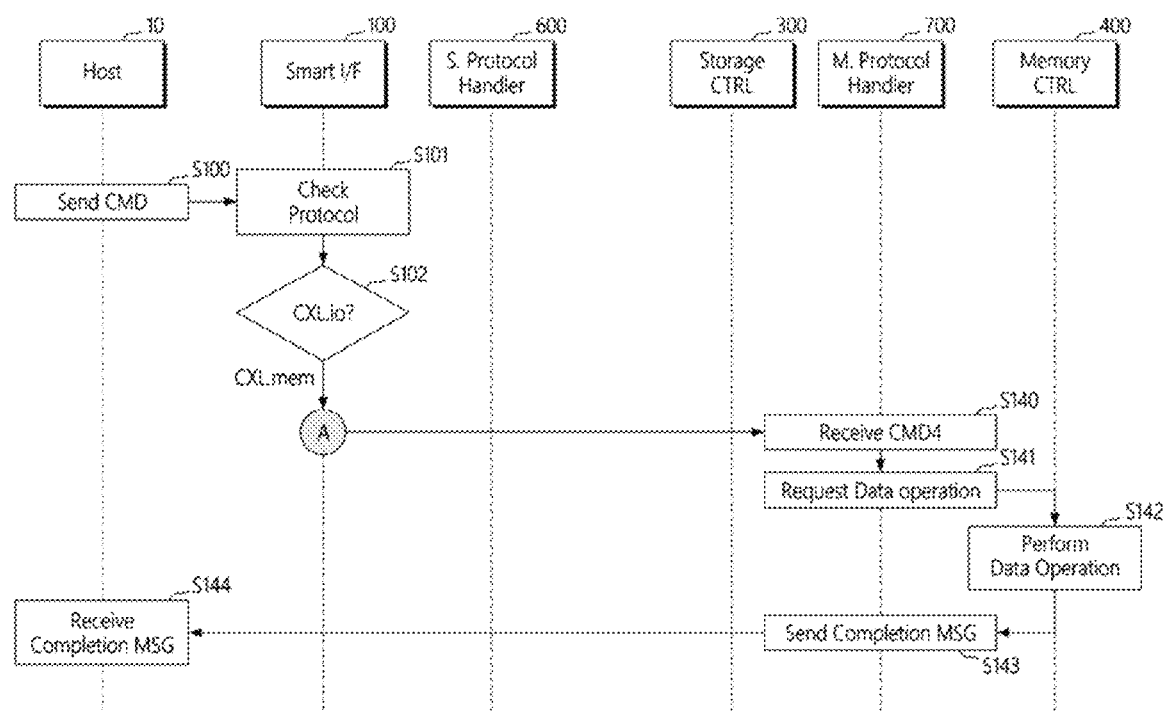

FIGS. 9 to 11 are flowcharts illustrating an operating method of the smart storage device of FIG. 7.

Referring to FIG. 9, when the host device 10 transmits a command (step S100), the smart interface 100 checks a protocol based on a target to which the command is to be transmitted (step S101).

When the command is for the storage device 390, the CXL.io protocol is selected (Yes in step S102), and the storage protocol handler parses the command (step S110). The storage protocol handler 600 checks the address information of the data to be requested from the parsed command (step S111), and when the address information (Storage ID) belongs to the storage device 390, the data access command CMD1 is transmitted to the storage controller 300.

The storage controller 300 reads the first data based on the address information (step S113) based on the data access command CMD1 (step S112) and transmits the data to the storage protocol handler 600.

On the other hand, when there is no additional operation to be performed based on the parsed command (step S114), the storage protocol handler 600 notifies the host device 10 of the performance completion by sending a completion message (step S119) that is received by the host 10 (step S120).

On the other hand, when it is necessary to write the first data to the memory device 490 based on the parsed command (step S114 in FIG. 9), the storage protocol handler 600 transfers the data access command CMD2 and the first data to the memory protocol handler 700 through the internal connection IPath2. The memory protocol handler 700 receives the data access command CMD2 and first data (step S115), and requests data access to the memory device 490 from the memory controller 400 (step S116).

The memory controller 400 writes the second data to the memory device 490 (step S117) and transmits the access completion message to the memory protocol handler 700. The memory protocol handler 700 notifies the storage protocol handler 600 of the performance completion (step S118), and the storage protocol handler 600 finally notifies the host device 10 of the performance completion (step S120).

On the other hand, as is shown in FIG. 10, the storage controller 300 receives the data access command CMD2 from the storage protocol handler 600 (S130) and generates a request for data (step S131). When it is necessary to read the third data from the memory device 490 based on the parsed command (step S114 in FIG. 10), the storage protocol handler 600 transfers the data access command CMD3 to the memory protocol handler 700 through the internal connection IPath2. The memory protocol handler 700 receives the data access command CMD3 (step S133), and requests data access to the memory device 490 from the memory controller 400 (step S134).

The memory controller 400 reads the third data from the memory device 490 (step S135). According to some embodiments, the storage controller 300 writes the third data received through the internal connection Ipath2 to the storage device 390 (step S136) and transmits a completion message to the memory protocol handler 700 (step S137). The storage protocol handler 600 finally notifies the host device 10 of the performance completion (step S138).

In FIG. 11, when the protocol checked by the smart interface 100 is the CXL.mem protocol (step S102), the command CMD sent from the host device 10 is transmitted to the memory protocol handler 700 (step S140). The memory protocol handler 700 transmits an access request according to a command CMD4 to the memory controller 400 (step S141), and the memory controller 400 performs an operation corresponding to the request for the memory device 490 (step S142), and then notifies the memory protocol handler 700 of the performance result. The memory protocol handler 700 transfers the performance result to the host device 10 (step S143) and the host 10 receives the performance result (step S144).

The above-described smart storage device 1000 may allow the host device 10 to consider at least two constituents among components of the smart storage device 1000, for example, an accelerator circuit, a storage device, and a memory device, as a separate device or a single device through a single smart interface. Accordingly, the latency overhead in which the host device 10 must intervene to transfer data may be reduced, and since the physical connection between the components is provided, software overhead for maintaining data coherence may be reduced.

What is claimed is:

1. A smart storage device, comprising:
   a smart interface directly connected to a host device;
   an accelerator circuit connected to the smart interface through a data bus conforming to a cache-coherent interconnect shared memory region cache protocol (cache protocol) and a cache-coherent interconnect memory pooling and expansion protocol (mem protocol), and configured to perform acceleration computation for data in an accelerator memory device in response to a computation command of the host device; and
   a storage controller connected to the smart interface through a data bus conforming to a cache-coherent interconnect device discovery, configuration, and I/O operations protocol (IO protocol) and configured to control a data access operation for data in an accelerator memory device of a storage device in response to a data access command of the host device,
   wherein the accelerator circuit is directly accessible to the storage device through an internal bus connected directly to the storage controller, while the accelerator circuit and the storage controller are each separately connected to the host device over the smart interface independent of the internal bus,
   wherein the accelerator circuit transmits a data access request to the storage controller through the internal bus without intervention of the host device in response to the computation command and receives a first data corresponding to the data access request in a non-volatile memory device through the internal bus and stores the first data into the accelerator memory device,
   wherein the internal bus is not directly connected to the host device.

2. The smart storage device of claim 1, wherein the accelerator circuit includes:
   a command (CMD) decoder circuit configured to extract computation information by decoding the computation command;
   a computation module configured to perform the acceleration computation in response to the decoded computation command;
   an accelerator memory controller circuit configured to write or read computation data generated by an operation of the computation module to or from an accelerator memory device;
   a direct memory access (DMA) engine connected to the storage controller to directly access the storage device; and
   a coherency engine configured to maintain coherency between the computation data stored in the accelerator memory device and data stored in the host device.

3. The smart storage device of claim 1, wherein the storage controller includes:

a scheduler circuit configured to receive a first access request from the host device and a second access request from the accelerator circuit and schedule an operation sequence according to a preset policy; and a control unit circuit configured to control to write or read data to or from the storage device.

4. The smart storage device of claim 2, wherein the DMA engine receives data from the storage controller by requesting data access to the storage controller based on the computation information, the coherency engine requests coherence processing for the received data to the host device, and the accelerator memory controller circuit stores the received data in the accelerator memory device.

5. The smart storage device of claim 2, wherein:

the accelerator memory controller circuit reads first computation data stored in the accelerator memory device, the computation module generates second computation data by performing the acceleration computation on the first computation data, and the coherency engine requests coherence processing for the host device for the second computation data.

6. The smart storage device of claim 5, wherein when the coherence processing is completed, the accelerator memory controller circuit writes the second computation data to the accelerator memory device, and the computation module notifies the host device of completion of the computation command.

7. A smart storage device, comprising:

a smart interface directly connected to a host device;

a memory controller circuit connected to the smart interface through a first data bus conforming to a cache-coherent interconnect device discovery, configuration, and I/O operations protocol (IO protocol) and a cache-coherent interconnect memory pooling and expansion protocol (mem protocol), and configured to control a first access operation for a memory device; and a storage controller connected to the smart interface through a second data bus that is different from the first data bus and conforming to the IO protocol, and configured to control a second access operation for a storage device different from the memory device, wherein the smart interface includes an internal connection bus directly connecting the first data bus conforming to the mem protocol and the IO protocol and the second data bus conforming to the IO protocol to directly access the memory controller circuit and the storage controller, wherein the internal connection bus is not directly connected to the host device.

8. The smart storage device of claim 7, further comprising:

a router connected to the data bus conforming to the IO protocol;

a memory protocol handler connected to the first data bus conforming to the mem protocol and the router to transmit and return a request for a first access operation to the memory controller circuit; and a storage protocol handler connected to the router to transmit and return a request for the second access operation.

9. The smart storage device of claim 8, wherein the storage protocol handler parses an access command received from the host device and checks an address of requested data.

10. The smart storage device of claim 9, wherein when the address of the requested data is an address of the memory device, the storage protocol handler transfers the access command to the memory protocol handler through the internal connection bus.

11. The smart storage device of claim 10, wherein when the requested data is accessed by transmitting the transferred access command to the memory controller circuit, the memory protocol handler notifies the storage protocol handler of a completion of a performance of the accessing of the requested data.

12. The smart storage device of claim 8, wherein the smart interface includes the router, the memory protocol handler, and the storage protocol handler.

13. A smart storage device, comprising:

a smart interface directly connected to a host device;

an accelerator circuit connected to the smart interface through a first data bus conforming to a cache-coherent interconnect shared memory region cache protocol (cache protocol) and a cache-coherent interconnect memory pooling and expansion protocol (mem protocol), and configured to perform acceleration computation in response to a computation command of the host device;

a storage controller connected to the smart interface through a second data bus conforming to a cache-coherent interconnect device discovery, configuration, and I/O operations protocol (IO protocol) and configured to control a data access operation for a storage device in response to a data access command of the host device; and a memory controller circuit connected to the smart interface through a third data bus conforming to the IO protocol and the mem protocol, and configured to control a second access operation for a memory device different from the storage device, wherein the storage controller is directly accessible to the accelerator circuit through a first internal connection that is separate from the smart interface that separately connects the storage controller and the accelerator circuit to the host device, wherein the smart interface includes a second internal connection directly connecting the second data bus and the third data bus to directly access the memory controller circuit and the storage controller, wherein the first and second internal connections are not directly connected to the host device.

14. The smart storage device of claim 13, wherein the accelerator circuit includes a direct memory access (DMA) engine connected to the storage controller through the first internal connection to directly access the storage device, and the storage controller includes a scheduler configured to schedule an operation sequence according to a preset policy for a request of the DMA engine received through the first internal connection and a request of the host device received through the second data bus conforming to the IO protocol.

15. The smart storage device of claim 14, wherein the accelerator circuit further includes:

a command (CMD) decoder circuit configured to extract computation information by decoding the computation command;

a computation module configured to perform the acceleration computation in response to the decoded computation command;

an accelerator memory controller circuit configured to write or read computation data generated by an operation of the computation module to or from an accelerator memory device; and a coherency engine configured to maintain coherency between the computation data stored in the accelerator memory device and data stored in the host device.

16. The smart storage device of claim 15, wherein the accelerator circuit requests a third access from the storage controller based on the computation information, requests coherence processing for first data received through the third access, and stores the first data in the accelerator memory device after the requested coherence processing has been performed.

17. The smart storage device of claim 13, further comprising a protocol handler configured to parse a command received from the host device, transmit the parsed command received from the host device to the storage controller when an address included in the command belongs to the storage device, and transmit the parsed command received from the host device to the memory controller circuit through the second internal connection when the address belongs to the memory device.

18. The smart storage device of claim 17, wherein the protocol handler includes:

a storage protocol handler connected between the storage controller and the smart interface; and a memory protocol handler connected between the memory controller circuit and the smart interface, wherein the memory protocol handler is connected to the smart interface through the second data bus conforming to the IO protocol and the third data bus conforming to the IO protocol and the mem protocol.

19. The smart storage device of claim 18, wherein the memory controller circuit performs the second access operation in response to the parsed command received from the host device, and notifies the storage protocol handler of a performance result of the second access operation.

* * * * *